No. 868,857. PATENTED OCT. 22, 1907.
I. T. GARNER.
SPECTACLES.
APPLICATION FILED APR. 23, 1907.
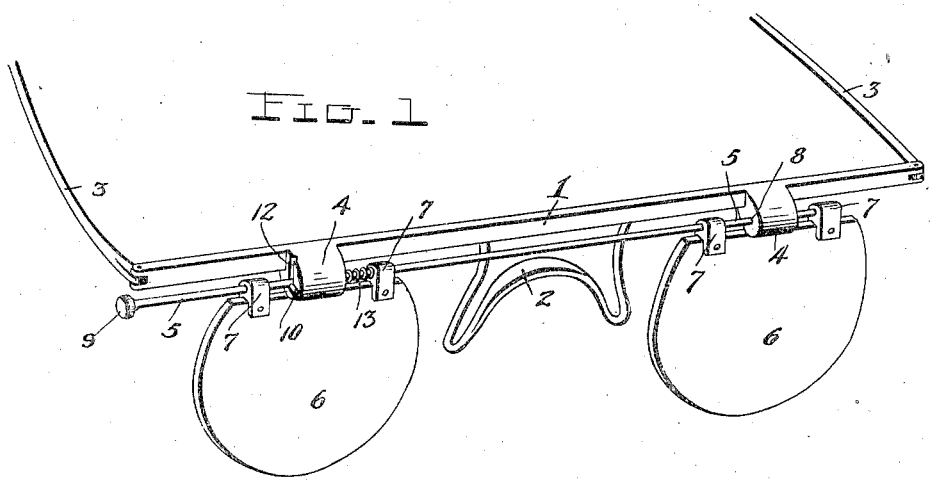
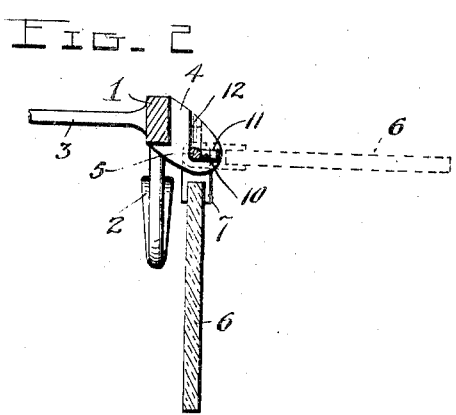
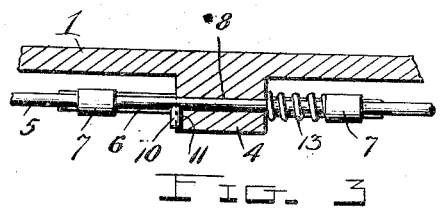
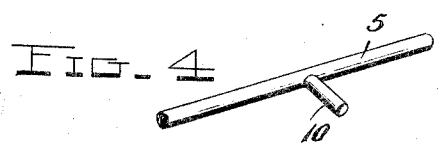
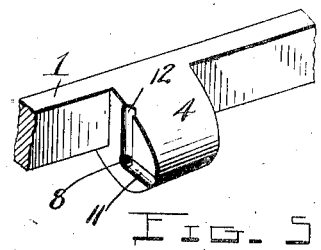
Witnesses
Inventor
I. T. Garner,
By Watson E. Coleman
Attorney

UNITED STATES PATENT OFFICE.

ISAAC T. GARNER, OF CALERA, ALABAMA.

SPECTACLES.

No. 868,857.

Specification of Letters Patent.

Patented Oct. 22, 1907.

Application filed April 23, 1907. Serial No. 369,746.

*To all whom it may concern:*

Be it known that I, ISAAC T. GARNER, a citizen of the United States, residing at Calera, in the county of Shelby and State of Alabama, have invented certain new and useful Improvements in Spectacles, of which the following is a specification, reference being had therein to the accompanying drawing.

My invention is an improved spectacle having its lenses so mounted that they may be swung up from their normal vertical position in front of the eyes to a horizontal position so that they project forwardly in a plane above the eyes.

The object of the invention is to provide a pair of spectacles of this character which will be especially useful for automobilists and others who use glasses only for certain purposes, since the lenses may be quickly swung to an inoperative position without removing the spectacles from the nose.

With the above and other objects in view the invention consists in the novel features of construction and the combination and arrangement of parts hereinafter described and claimed, and illustrated in the accompanying drawings, in which Figure 1 is a perspective view of one embodiment of my invention; Fig. 2 is a detail cross section; Fig. 3 is a detail horizontal or longitudinal section; Fig. 4 is a perspective of a portion of the operating rod; and Fig. 5 is a similar view of one of the bearings for said rod.

My improved spectacles or eye glasses comprise a supporting body or frame 1 which may be of any suitable shape, form and construction having adjacent to its center a suitable nose piece 2 and at its ends suitable bows 3. As shown, the body 1 is in the form of a straight bar and is provided at suitable points with bearings 4 in which is slidably and rotatably mounted a rod or shaft 5 adapted to serve as a means for suspending and operating the lenses 6. The latter may be of any desired shape and mounted in any suitable manner but, as illustrated, they are secured in hangers 7 which are fixed to the rod 5. This rod extends across the body or frame 1 and through alined bearing openings 8 in the bearings 4 in which openings it is adapted to have a free rotary and a limited sliding movement. At one end of the rod is provided a suitable finger piece 9 and projecting radially from the rod adjacent to one of the bearings 4 is a locking pin 10 which is adapted to enter keeper seats or notches 11, 12 formed in the adjacent end of said bearing 4 and radiating from the opening 8 in said bearing in planes at right angles. The notch or seat 11 extends forwardly or horizontally, while the notch or seat 12 extends upwardly or vertically. The locking pin 10 projects from the rod 5 in a plane at right angles to that of the lenses 6 so that when the latter are vertically disposed they will be held in such lowered position by the engagement of the pin 10 with the seat 11 and when the rod 5 is turned to swing the pin 10 up and into the seat 12, the lenses will be raised to a horizontal position in which they will be held, as shown in dotted lines in Fig. 2. The locking pin 10 is retained in either one of its seats or notches for the purpose of locking the lenses in either of their two positions, by a coil spring 13 which surrounds the rod 5 and is confined between the opposite side of said bearing 4 and the adjacent lens hanger 7, as clearly shown in Figs. 1 and 3. This spring 13 tends to move or slide the rod 5 longitudinally to press the pin 10 against the adjacent end of the bearing 4 and into either of its two seats 11, 12.

From the foregoing it will be seen that when the lenses are mounted upon their supporting frame or body in accordance with the invention, they may be readily swung up to an inoperative or out of the way position when they are not needed and it will therefore be unnecessary to remove the spectacles from the nose or to raise them upon the forehead when one desires to temporarily dispense with their use.

It will be seen that the invention is particularly adapted for use of automobilists and others who need glasses for certain purposes only.

While I have shown and described the preferred embodiment of my invention I wish it understood that I do not limit myself to the precise showing herein set forth and that various changes in the form, proportion and minor details of construction may be resorted to within the scope of the appended claims.

Having thus described my invention what I claim and desire to secure by Letters Patent is:—

A device of the character described comprising a supporting bar, a nose piece arranged centrally upon said bar, bows attached to the ends of said bar, bearing lugs projecting from said bar between its ends and the nose piece and formed with alined bearing openings, one of said lugs being formed at one end with right angularly arranged grooves opening into the bearing opening in said lug, an operating rod rotatably and slidably mounted in the bearing openings in said lugs and provided with a finger piece, a locking pin projecting radially from said rod and adapted to enter either of said grooves, lenses, lens hangers fixed to said lenses and to said rod, the lens hangers for each lens being spaced apart and adapted to receive one of the bearing lugs between them and a coil spring arranged upon said rod and confined between one of said hangers and the bearing lug containing said grooves, substantially as and for the purpose set forth.

In testimony whereof I hereunto affix my signature in presence of two witnesses.

ISAAC T. GARNER.

Witnesses:
S. J. LORGE,
E. L. EVANS.